US005908079A

United States Patent [19]
Amino

[11] Patent Number: 5,908,079

[45] Date of Patent: Jun. 1, 1999

[54] AIR INTAKE APPARATUS OF MOTORCYCLE

[75] Inventor: Hideo Amino, Saitama, Japan

[73] Assignee: Honda Giken Kogyo Kabushiki Kaisha, Tokyo, Japan

[21] Appl. No.: 08/908,948

[22] Filed: Aug. 8, 1997

[30] Foreign Application Priority Data

Aug. 9, 1996 [JP] Japan .................................... 8-211551

[51] Int. Cl.[6] ...................................................... B62J 35/00

[52] U.S. Cl. ............................................ 180/219; 180/68.3

[58] Field of Search .................................... 180/68.3, 219

[56] References Cited

U.S. PATENT DOCUMENTS

| | | | |
|---|---|---|---|
| 4,364,340 | 12/1982 | Kimura | 180/219 |
| 4,509,613 | 4/1985 | Yamaguchi | 180/219 |
| 4,648,474 | 3/1987 | Shinozaki et al. | 180/219 |
| 4,799,569 | 1/1989 | Hattori et al. | 180/219 |
| 5,560,446 | 10/1996 | Onishi | 180/219 |

FOREIGN PATENT DOCUMENTS

| | | |
|---|---|---|
| A8-108877 | 4/1996 | Japan . |

*Primary Examiner*—J J Swann
*Assistant Examiner*—Clovia Hamilton
*Attorney, Agent, or Firm*—Birch, Stewart, Kolasch & Birch, LLP

[57] ABSTRACT

An air intake apparatus is mounted on a motorcycle provided with a V-type engine having a front cylinder and a rear cylinder. Carburetors are provide for the respective cylinders, and a sub-chamber is interposed between an air cleaner and the side of the engine. Communication tubes for feeding air from the air cleaner to the respective carburetors are disposed inwardly of the air cleaner in the width direction of the motorcycle body and outwardly of the carburetors in the width direction of the motorcycle body. The sub-chamber is extended downward, and the communication tube extending from one of the carburetors is connected projectedly into the sub-chamber. In this way, the volume of a sub-chamber is secured and the air intake characteristics of a plurality of communication tubes for air intake are equalized by equalizing the length of the communication tubes.

20 Claims, 5 Drawing Sheets

AIR INTAKE APPARATUS OF MOTORCYCLE

BACKGROUND OF THE INVENTION

1. Field of the Invention

This invention relates to an air intake apparatus of a motorcycle.

2. Description of Background Art

In some motorcycles, air cleaned by an air cleaner is fed into carburetors of respective cylinders of the engine of the motorcycle. In each carburetor, air is mixed with evaporated fuel to form an air-fuel mixture. The air-fuel mixture is then fed into each cylinder of the engine. In such an engine, pulsations occur in the intake passage due to the intermittent intake stroke of each cylinder. These pulsations are transmitted to an air cleaner provided upstream of the intake passage and cause intake noise.

To prevent such intake noise in some motorcycles, a sub-chamber is provided midway along the intake passage between the air cleaner and the carburetor to reduce the transmission of the pulsations, and the intake noise is reduced. For example, FIGS. 5(A) and 5(B) show a motorcycle including a V-type engine 100 having a front cylinder 100*a* and a rear cylinder 100*b*. A sub-chamber 103 is provided midway along the air intake passage between an air cleaner 101 and a pair of carburetors 102*a*, 102*b*. The sub-chamber 103 is disposed above the front cylinder. The sub-chamber 103 is connected to the carburetors 102*a*, 102*b* through a pair of communication tubes 104*a*, 104*b*.

Alternately, in some motorcycles, an air intake chamber is provided on the upstream side of an air cleaner for reducing air intake pulsations (refer to Japanese Patent Laid-open No. Hei 8-108877). In that arrangement, the air intake chamber is disposed above a V-type engine and extends over the main frame.

A sub-chamber or air intake chamber having a large volume is desirable for suppressing the transmission of air intake pulsations, but it is difficult to obtain the desired volume when the sub-chamber is disposed at the above-mentioned location.

SUMMARY AND OBJECTS OF THE INVENTION

It is an object of the present invention to provide an air intake apparatus with improved performance wherein a large sub-chamber volume is provided, and air intake characteristics of each cylinder are equalized.

To solve the above-mentioned problem, the present invention provides an air intake apparatus for a motorcycle having a V-type engine with a plurality of cylinders disposed in a front-rear direction. A carburetor is provided for each cylinder, and an air cleaner is used for cleaning intake air. The air cleaner is disposed on the side of the V-type engine and is provided with a sub-chamber between the air cleaner and communication tubes for feeding intake air to the respective carburetors. The sub-chamber is disposed inwardly of the air cleaner in the width direction of the motorcycle and outwardly from the carburetors in the width direction of the motorcycle. The bottom of the sub-chamber is extended on the side of the space formed between the cylinders and along the front or rear face of any one of the cylinders.

The sub-chamber disposed as such extends in the front-rear direction and downward, and the ability to provide adequate sub-chamber volume is improved. In particular, the sub-chamber volume is obtained by extending the sub-chamber downward, effectively utilizing the space formed between the sides of the cylinders and in the front or rear of any one of the cylinders. The volume obtained is not restricted by other apparatus provided on the motorcycle.

For example, in some conventional motorcycles having a V-type engine with cylinders disposed in a front-rear direction, intake air is fed to respective cylinders through a sub-chamber, wherein the sub-chamber is disposed above the head of the front cylinder (refer to FIG. 5(A)). Therefore, the lengths of communication tubes extending from the sub-chamber to the carburetors are unequal. However, it is desirable to equalize the length of the communication tubes in order to equalize the air intake characteristics of air intake passages connected to each cylinder.

In the present invention, the upstream end of the communication tube which is connected to the carburetor disposed closest to the sub-chamber is projected into the sub-chamber in order to equalize the length of the respective communication tubes.

The cylinders disposed in front-rear direction are disposed with a deviation in the width direction of the motorcycle. Accordingly, carburetors attached to these respective cylinders are naturally disposed with some deviation. Therefore, if the sub-chamber is disposed outwardly of the carburetors in the width direction of the motorcycle, the lengths of the communication tubes extending from the respective carburetors to the sub-chamber are unequal due to the deviation between the respective carburetors in the width direction of the motorcycle. However, in the present invention, the upstream end of the communication tube connected to the carburetor disposed nearest to the sub-chamber is connected to and projected into the sub-chamber. In this way, the lengths of both communication tubes are equalized.

In the present invention, the sub-chamber can be expanded depending on the projection length of the communication tube into the sub-chamber, and thereby substantial reduction of sub-chamber volume is prevented.

Further scope of applicability of the present invention will become apparent form the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
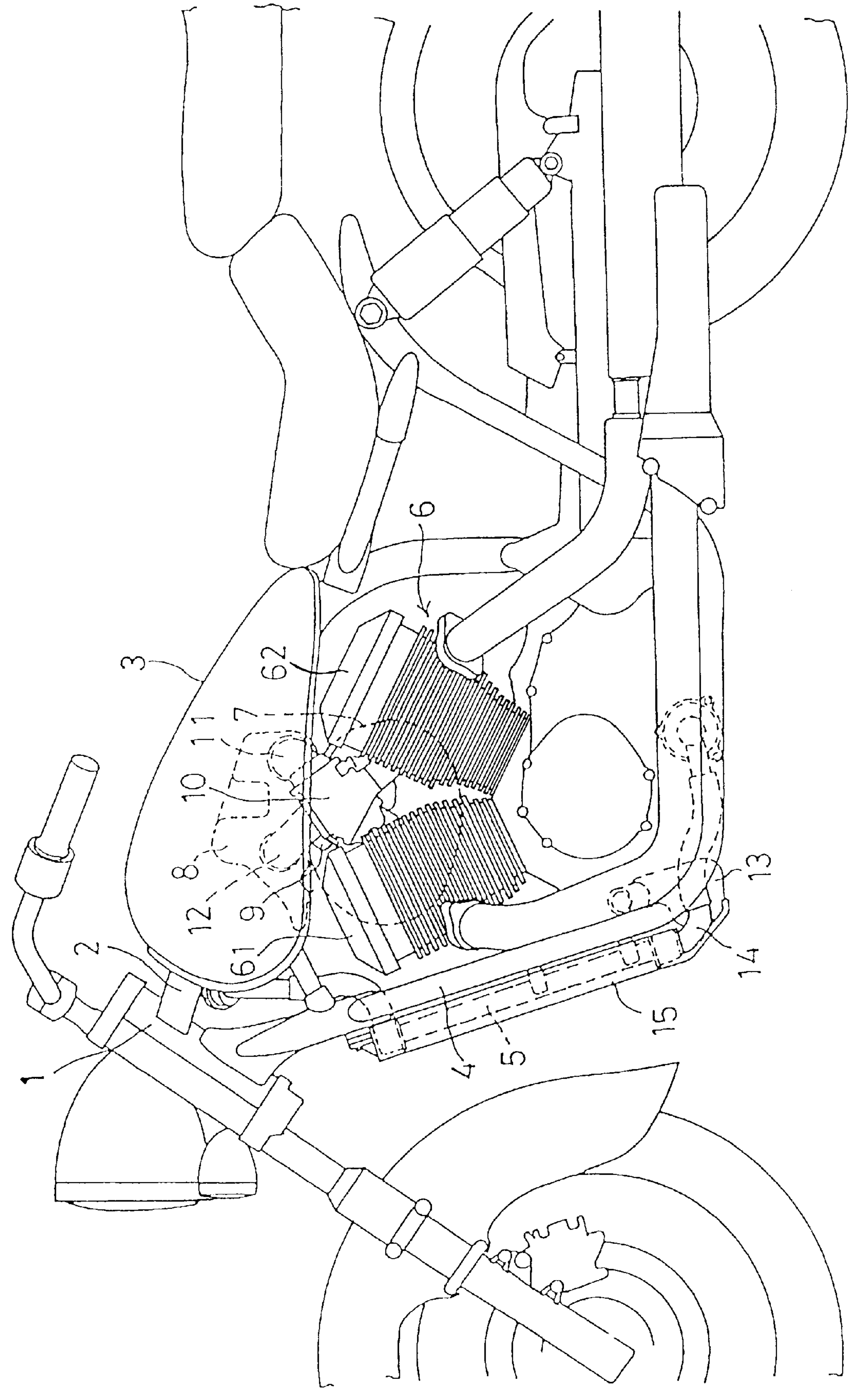
FIG. 1 is a side view illustrating a motorcycle on which an air intake apparatus of the present invention is mounted.

Hereinafter, a preferred embodiment of the present invention will be described with reference to the drawings.

With reference to FIG. 1 to FIG. 4, FIG. 1 represents a motorcycle including a steering head 1 attached to a main frame 2. A fuel tank 3 is mounted on the main frame 2 and extends rearwardly from the steering head 1 above the motorcycle body. A radiator 5 for dissipating heat from the engine cooling water is mounted in front of a down frame 4 extending rearwardly from the steering head 1 under the motorcycle body.

In such a motorcycle, a water-cooled V-type engine 6 having a front cylinder 61 and a rear cylinder 62 is mounted between the main frame 2 and the down frame 4. An air cleaner 7 for cleaning intake air used for combustion is provided on the side of the engine 6, for example in this embodiment, on the right side in the forward direction. A sub-chamber 8 having a space with a desired volume and communicating with the downstream side of the air cleaner 7 is provided on the right side of the main frame 2 located adjacent to the inside of the air cleaner 7 in the width direction of the motorcycle body. A filter may be provided in the sub-chamber 8 for further cleaning the air, which has already been cleaned by the main air cleaner 7.

A first carburetor 9 extending in ascendant direction toward the rear of the motorcycle is connected to an air inlet port 61*a* formed on the rear side face of the front cylinder 61 of the engine 6. A second carburetor 10 extending in ascendant direction toward the front of the motorcycle is connected to an air inlet port 62*a* formed on the front face of the rear cylinder 62. Both carburetors 61 and 62 are disposed in a space between the cylinders 61 and 62 in an intersecting manner with each other. These cylinders 61 and 62 are different in right-left position depending on the difference in the position of respective crank pins in the engine 6. Also, the attached carburetors 9 and 10 are different in right-left position. Communication tubes 11 and 12 are connected to the top opening of the respective carburetors 9 and 10 and connected to the sub-chamber 8. Accordingly, intake air is cleaned in the air cleaner 7 and thereafter introduced to the respective carburetors 9 and 10 through the respective communication tubes 11 and 12.

The fuel tank 3 is connected to the respective carburetors 9 and 10 through fuel supply pipes (not shown in the figure). The radiator 5 is part of a circulation closed loop of engine cooling water which includes piping 14, the engine 6, radiator 5, and cooling water reserve tank 13 connected in this order to form a closed loop. Engine cooling water is pressurized with a pump (not shown in the figure) to circulate in the circulation closed loop.

Figure 2:
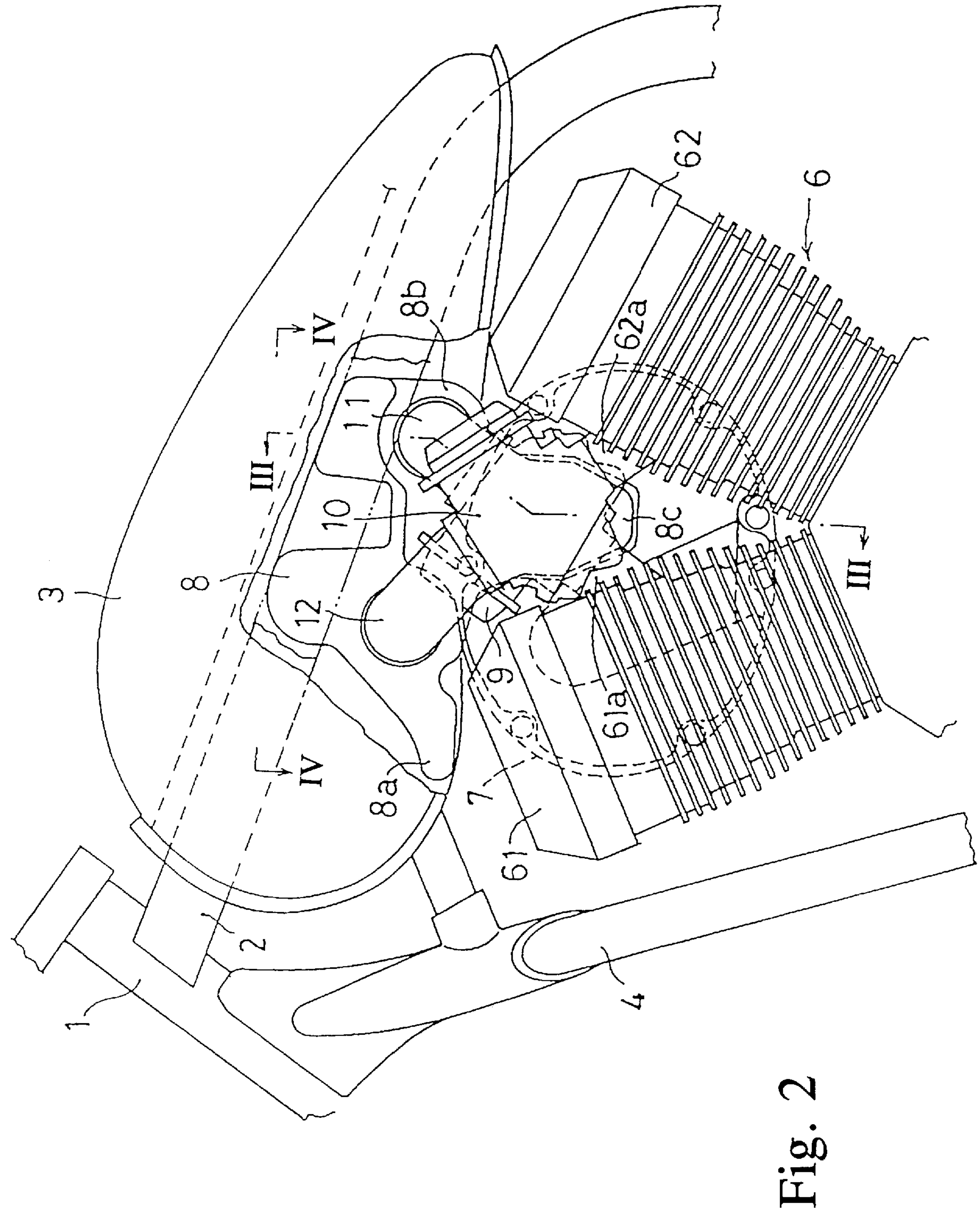
FIG. 2 is a partial side view of the air intake apparatus.
Figure 3:
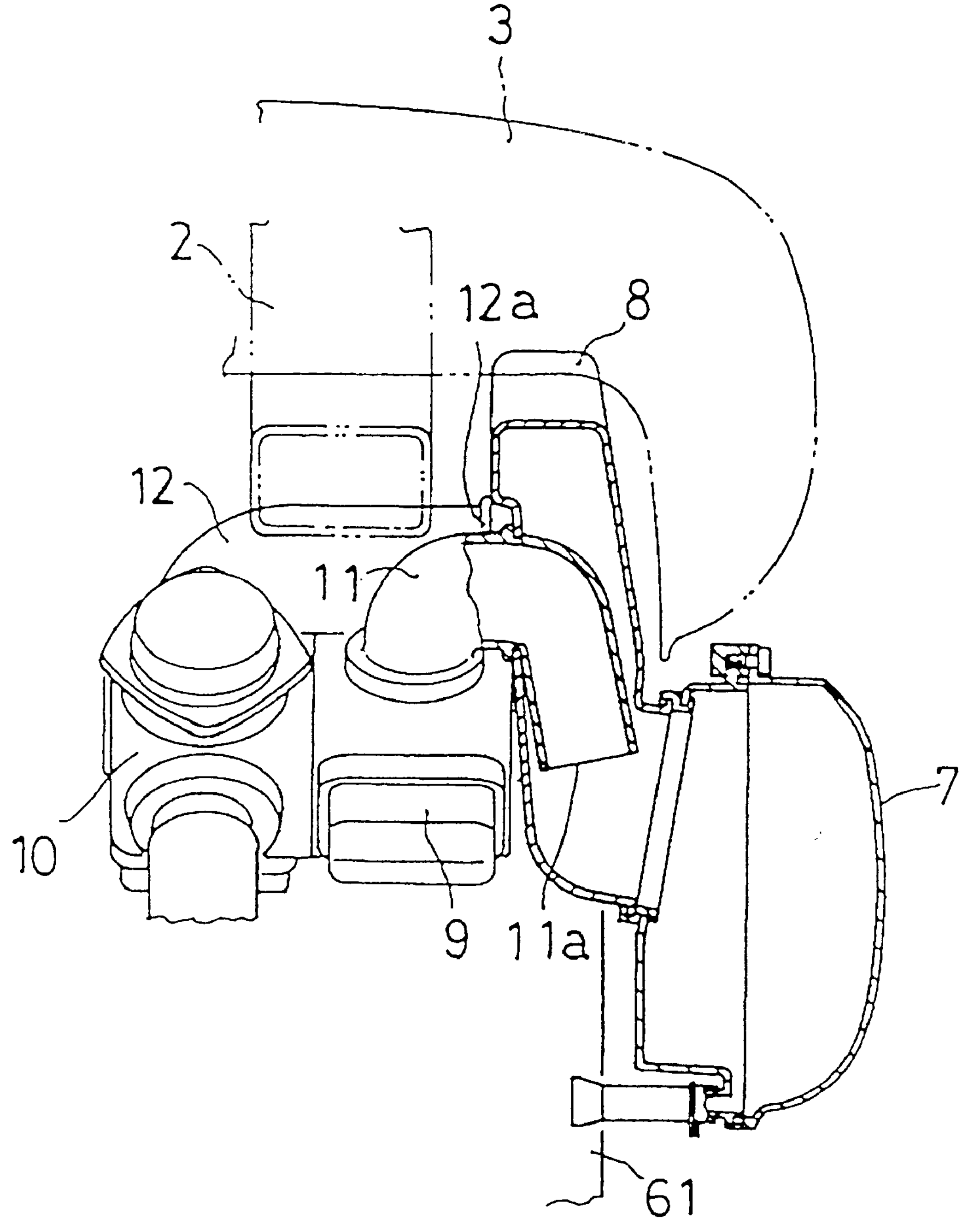
FIG. 3 is a cross-sectional view along the line III—III in FIG. 2 for partially illustrating the air intake apparatus.
Figure 4:
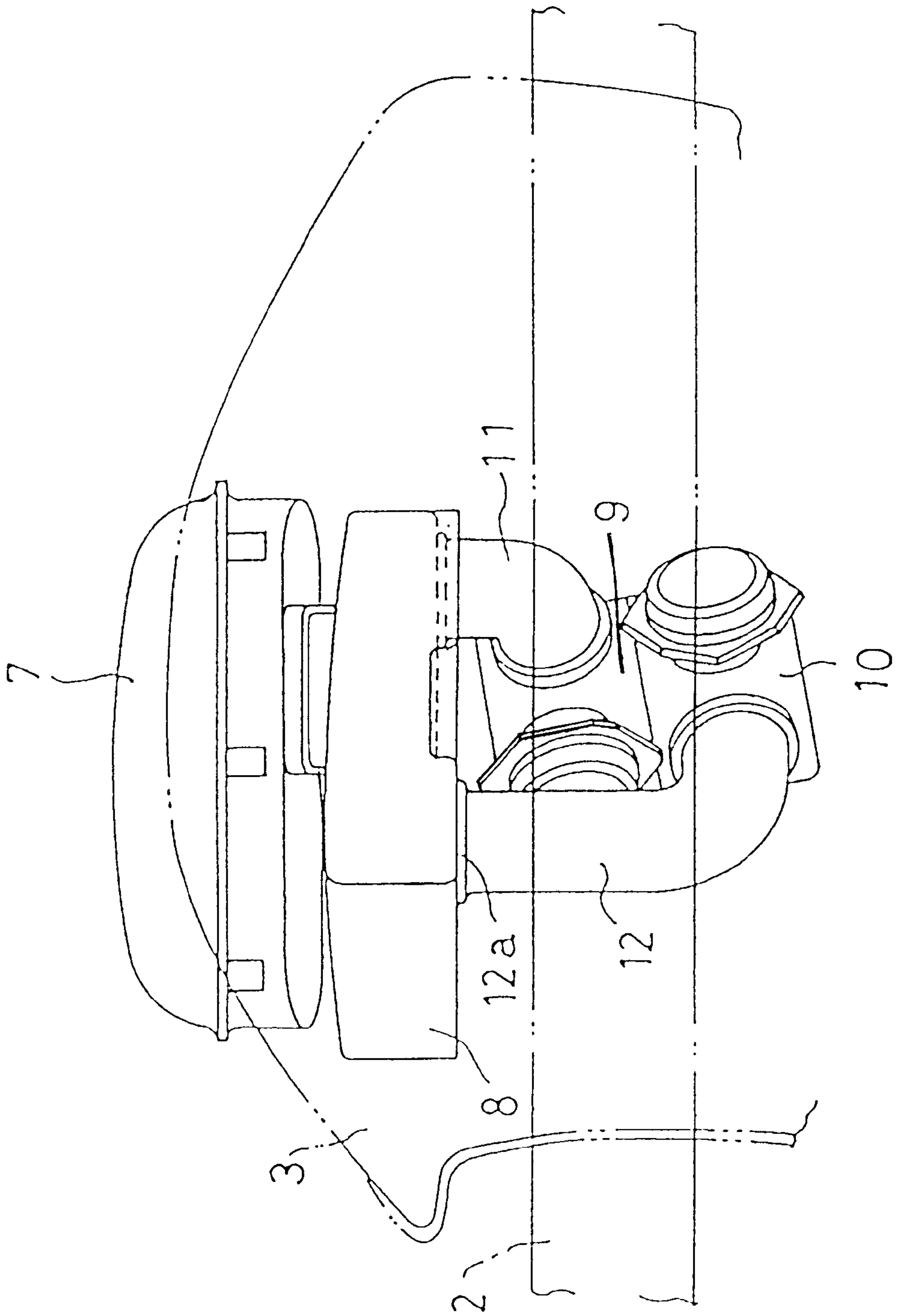
FIG. 4 is a cross-sectional view along the line IV—IV in FIG. 2 for partially illustrating the air intake apparatus.
Figure 5A:
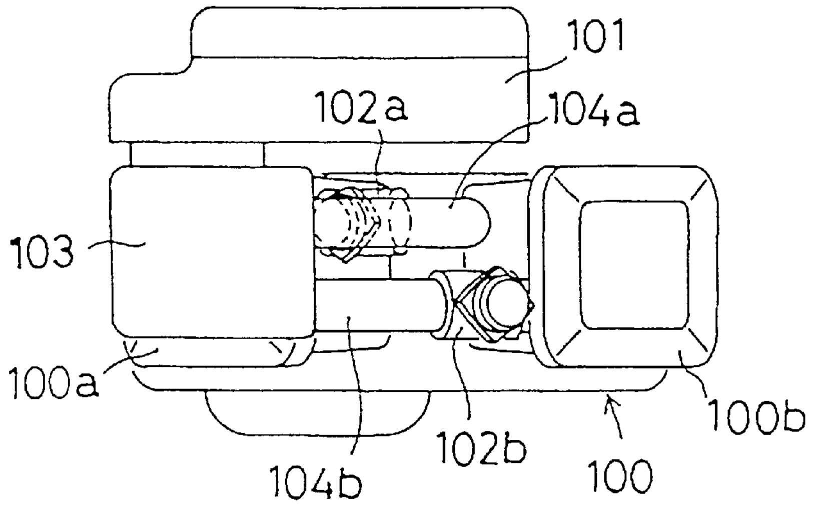
Fig. 5(A) BACKGROUND ART
FIG. 5(A) is a top view of the sub-chamber of a conventional air intake apparatus.
Figure 5B:
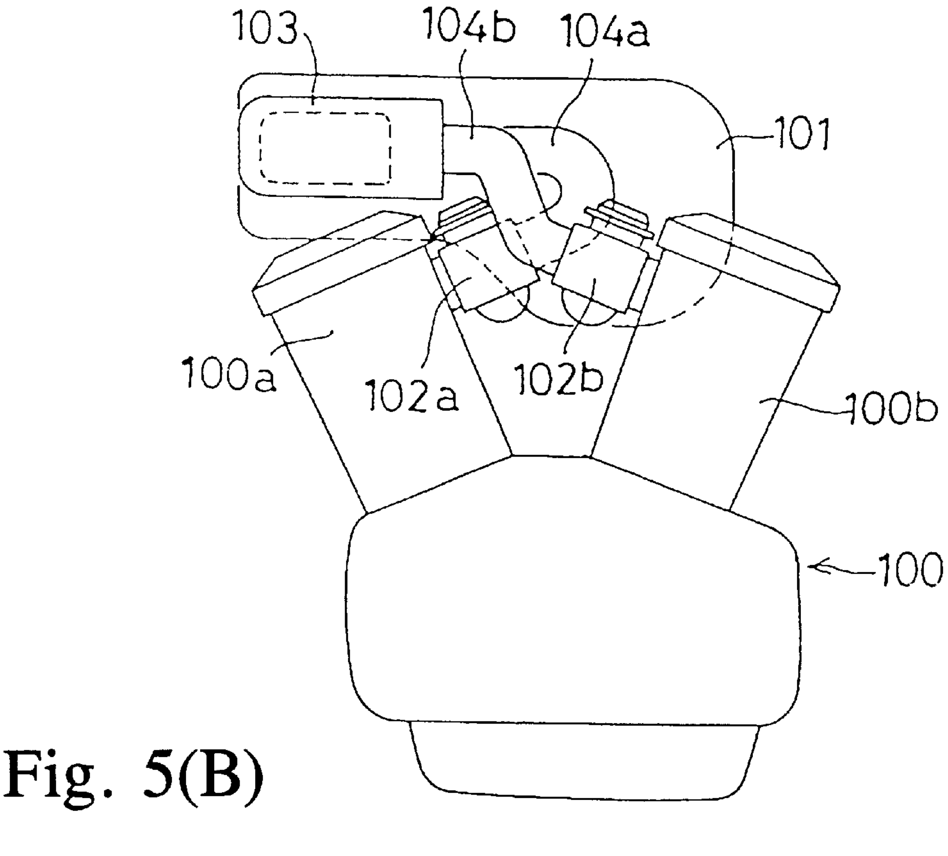
Fig. 5(B) BACKGROUND ART
FIG. 5(B) is a side view of the sub-chamber of the conventional air intake apparatus.

As described herein above, the sub-chamber 8 is disposed on the right side of the main frame 2, namely between the inside face of the air cleaner 7 in the width direction of the motorcycle body and the outside face of the first carburetor 9 in the width direction of the motorcycle body. The sub-chamber extends in a front-rear direction from the front end 8*a* to the rear end 8*b*, and extends to the bottom end 8*c* disposed between both cylinders (FIG. 2). The volume of the sub-chamber 8 is therefore quite large. The sub-chamber 8 can be extended utilizing a space formed on the side of both cylinders 61 and 62. By extending the sub-chamber 8 downward, the sub-chamber 8 can be extended without increasing of the height of the motorcycle body.

As the result of expansion of the sub-chamber 8 in the front-rear direction of the motorcycle body, in the case where the top openings 9*a* and 10*a* of the carburetors 9 and 10 are located adjacent in front-rear direction as shown in the figure, the communication tubes 11 and 12 for connection with the top opening 9*a* and 10*a* can be disposed in parallel in the width direction of the motorcycle body, and mutual interference of the communication tubes 11 and 12 can be easily avoided.

In the V-type engine 6, the cylinders 61 and 62 are disposed with one cylinder in front of the other and deviated from each other in width direction of the motorcycle body. In other words, the cylinders 61 and 62 are not aligned along a longitudinal axis of the motorcycle. Therefore, the respective positions of the top openings of the carburetors 9 and 10 connected to the respective cylinders 61 and 62 deviate in the width direction of the motorcycle body.

If the upstream ends 11*a* and 12*a* of the communication tubes 11 and 12 extending from the respective top openings of the carburetors 9 and 10 were drawn in the width direction of the motorcycle body and connected to the sub-chamber, the communication tubes 11 and 12 would be different in length. As such, the air intake characteristics would be different. To equalize the length of the communication tubes 11 and 12, the upstream end 11*a* of the communication tube 11 extending from the first carburetor 9 disposed nearer the sub-chamber 8 is inserted projectingly into the sub-chamber 8 to equalize the air intake characteristics in this embodiment.

Extending the communication tubes 11 and 12 into the sub-chamber 8 results in a substantial decrease in volume of the sub-chamber 8, and can diminish the intake pulsation reduction effect. However, the sub-chamber is extended downward along the cylinders to increase the volume, and the volume of the sub-chamber 8 is increased by an amount corresponding to the projected insertion volume of the communication tube 11 in order to secure the desired volume of the sub-chamber 8.

According to the present invention, in spite of the fact that the sub-chamber 8 is provided on the side of the engine, the proper sub-chamber volume can be obtained, while the air intake characteristics in the air intake passages are maintained equal. As a result, the fuel tank 3 may be disposed near the engine 6, or the volume of the fuel tank 3 can be easily increased.

In some motorcycles in which a radiator 5 is mounted on a down frame 4 provided in front of an engine 6, the radiator is protected by a cover 15 for covering the radiator 5. By using a resin cover 15 formed solidly together with a cooling water reserve tank 14 formed under the cover body 15*a*, the structure of the portion from the radiator 5 to the reserve tank 13 is compact. Thereby, the reserve tank 13 is disposed adjacent to the radiator 5, and the pipe connecting the radiator 5 to the reserve tank 13 can be short. In this way, piping work becomes easy, and such structure leads to reduced cost.

As described hereinbefore, according to the present invention, the sub-chamber is extended downward in the space where no other components are disposed. In this way, the sub-chamber can be extended without increasing the height of the motorcycle body.

The communication tube of the carburetor disposed nearer the sub-chamber is inserted projectedly into the sub-chamber, and thereby the length of both communication tubes are equalized, and the air intake characteristics of respective cylinders can be equalized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An air intake apparatus for a motorcycle, said motorcycle including a V-type engine having a plurality of cylinders disposed in front-rear relation, said engine including a front side, a rear side, an upper side, a lower side, and a pair of right and left lateral sides, a plurality of carburetors, one for each of said cylinders, and an air cleaner for cleaning intake air disposed on one of said lateral sides of the V-type engine, said air intake apparatus comprising:

a sub-chamber located between said air cleaner and said engine; and a pair of communication tubes for feeding intake air from the sub-chamber to the respective carburetors, wherein said sub-chamber is disposed on said one of said lateral sides of the engine inwardly of the air cleaner in the width direction of the motorcycle and outwardly of the carburetors in the width direction of the motorcycle.

2. The air intake apparatus as set forth in claim 1, wherein an upstream end of one of said communication tubes which is connected to one of the carburetors which is disposed nearest to the sub-chamber projects into the sub-chamber by an amount substantially larger than a projecting amount of the other of said communication tubes into said sub-chamber in order to equalize the length of the respective communication tubes.

3. The air intake apparatus as set forth in claim 1, wherein a lower portion of the sub-chamber extends between the cylinders.

4. The air intake apparatus as set forth in claim 1, wherein said air cleaner includes a first air filter therein, and said sub-chamber includes a second air filter therein.

5. An air intake apparatus for a motorcycle, said motorcycle having a frame supported by a plurality of wheels, an engine mounted on said frame, said engine having at least two cylinders arranged one in front of the other, said engine including a front side, a rear side, an upper side, a lower side, and a pair of right and left lateral sides, and at least two carburetors, one for each of said cylinders, said air intake apparatus comprising:

an air cleaner located at one of said lateral sides of said engine;

a sub-chamber connected to said air cleaner, said sub-chamber located at said one of said lateral sides of said engine and between said air cleaner and said engine; and at least two intake tubes, one for each carburetor, extending from each respective carburetor to said sub-chamber.

6. The air intake apparatus as set forth in claim 5, wherein said intake tubes are equal in length.

7. The air intake apparatus as set forth in claim 6, wherein one of said intake tubes projects into said sub-chamber by an amount substantially larger than a protecting amount of the other of said intake tubes into said sub-chamber.

8. The air intake apparatus as set forth in claim 5, wherein one of said intake tubes projects into said sub-chamber by an amount substantially larger than a projecting amount of the other of said intake tubes into said sub-chamber.

9. The air intake apparatus as set forth in claim 8, wherein said air cleaner includes a first air filter therein, and said sub-chamber includes a second air filter therein.

10. The air intake apparatus as set forth in claim 4, wherein said air cleaner includes a first air filter therein, and said sub-chamber includes a second air filter therein.

11. The air intake apparatus as set forth in claim 5, wherein a portion of said sub-chamber is located between said cylinders.

12. A motorcycle comprising:

a frame supported by a plurality of wheels;

an engine mounted on said frame, said engine having at least two cylinders arranged one in front of the other, said engine including a front side, a rear side, an upper side, a lower side, and a pair of right and left lateral sides;

at least two carburetors, one for each of said cylinders;

an air cleaner located at one of said lateral sides of said engine;

a sub-chamber connected to said air cleaner, said sub-chamber located at said one of said lateral sides of said engine and between said air cleaner and said engine; and at least two intake tubes, one for each carburetor, extending from each respective carburetor to said sub-chamber.

13. The motorcycle as set forth in claim 12, wherein said intake tubes are equal in length.

14. The motorcycle as set forth in claim 13, wherein one of said intake tubes projects into said sub-chamber by an amount substantially larger than a protecting amount of the other of said intake tubes into said sub-chamber.

15. The motorcycle as set forth in claim 12, wherein one of said intake tubes projects into said sub-chamber by an amount substantially larger than a protecting amount of the other of said intake tubes into said sub-chamber.

16. The motorcycle as set forth in claim 15, wherein said air cleaner includes a first air filter therein, and said sub-chamber includes a second air filter therein.

17. The motorcycle as set forth in claim 12, wherein said air cleaner includes a first air filter therein, and said sub-chamber includes a second air filter therein.

18. The motorcycle as set forth in claim 12, wherein a portion of said sub-chamber is located between said cylinders.

19. An air intake apparatus for a motorcycle, said motorcycle having a frame supported by a plurality of wheels, an engine mounted on said frame, said engine having at least two cylinders arranged one in front of the other, and at least two carburetors, one for each of said cylinders, said air intake apparatus comprising:

an air cleaner located at one side of said engine;

a sub-chamber connected to said air cleaner, said sub-chamber located at said one side of said engine and between said air cleaner and said engine; and at least two intake tubes, one for each carburetor, extending from each respective carburetor to said sub-chamber, wherein said air cleaner includes a first air filter therein, and said sub-chamber includes a second air filter therein.

20. A motorcycle comprising:

a frame supported by a plurality of wheels;

an engine mounted on said frame, said engine having at least two cylinders arranged one in front of the other;

at least two carburetors, one for each of said cylinders;

an air cleaner located at one side of said engine;

a sub-chamber connected to said air cleaner, said sub-chamber located at said one side of said engine and between said air cleaner and said engine; and at least two intake tubes, one for each carburetor, extending from each respective carburetor to said sub-chamber, wherein said air cleaner includes a first air filter therein, and said sub-chamber includes a second air filter therein.

* * * * *